United States Patent [19]

Korban et al.

[11] Patent Number: 4,817,464
[45] Date of Patent: Apr. 4, 1989

[54] FRICTIONLESS CONTINUOUSLY VARIABLE TRANSMISSION

[76] Inventors: Joseph F. Korban; Nouhad F. Korban, both of 220 E. Mermaid Ln., #159, Philadelphia, Pa. 19118

[21] Appl. No.: 36,913

[22] Filed: Apr. 9, 1987

Related U.S. Application Data

[63] Continuation-in-part of Ser. No. 851,405, Apr. 11, 1986.

[51] Int. Cl.$^4$ ............................................... F16H 3/44
[52] U.S. Cl. .......................................... 74/793; 74/63
[58] Field of Search ................. 74/793, 773, 804, 756, 74/757, 805, 797, 63

[56] References Cited

U.S. PATENT DOCUMENTS

| | | | |
|---|---|---|---|
| 1,297,092 | 3/1919 | Carlson | 74/797 |
| 1,389,622 | 9/1921 | Buehler | 74/797 |
| 2,090,810 | 8/1937 | Russell et al. | 74/797 |
| 2,149,668 | 3/1939 | Crosthwaite | 74/63 |
| 2,734,397 | 2/1956 | Bade | 74/796 |
| 2,747,434 | 5/1956 | Bade | 74/796 |
| 4,184,388 | 1/1980 | Sfredda | 74/793 |
| 4,352,297 | 10/1982 | Nardi | 74/63 |
| 4,660,427 | 4/1987 | Fenton | 74/805 |

*Primary Examiner*—Leslie A. Braun
*Assistant Examiner*—David Novais
*Attorney, Agent, or Firm*—Morgan & Finnegan

[57] ABSTRACT

An infinitely variable speed transmission is disclosed which transmits externally applied driving torque to an output shaft through a pinion arm which engages a gear mounted on the end of the output shaft. The pinion arm can freely pivot around the bevel gear throughout the full 360 degree rotation of the input and output shafts. A locking mechanism is provided which allows the user to lock the pinion arm to the bevel gear. This enables the applied torque to be transferred through the pinion arm to the output shaft. The distance separating the input and output shafts can be varied by the user. By selectively varying the shafts' separation the effective transmission ratio can be continuously varied.

12 Claims, 6 Drawing Sheets

FRICTIONLESS CONTINUOUSLY VARIABLE TRANSMISSION

RELATED APPLICATION

This application is a continuation-in-part of Ser. No. 851,405, presently pending, filed Apr. 11, 1986.

FIELD OF THE INVENTION

This invention relates generally to machine elements, mechanisms, and variable-ratio mechanical power transmissions and, more specifically, to infinitely and continuously variable transmissions.

BACKGROUND OF THE INVENTION

Mechanical transmissions containing either several discrete gear ratios or continuously variable mechanisms are necessary whenever it is desirable to operate a rotating power source at certain preferred angular velocities. Transmissions are utilized for a wide variety of applications, including use in machine shop equipment, construction equipment, other types of personal and public transportation, and product handling equipment such as conveyor lines. This need is especially common in the automotive industry because internal combustion engines produce very different levels of torque and power across their operating ranges. These should not, for purposes of this application, be viewed as the only uses for the hereinafter described invention. It can be applied in any situation where it is desirable to vary the angular velocity of a rotating shaft.

Most mechanical transmissions contain a set of discrete gear ratios. This fixed number of ratios often results in an inability to continually operate the power source at its optimal setting. If a continuously variable transmission is used, however, the power source can be operated at its desired operational setting and the transmission's nominal ratio can be varied to change the angular velocity of the power output shaft as necessary.

A transmission which performs in this manner is ideally suited for use with a power source which operates at preferred, fixed angular velocities. Such a power source, commonly referred to as a CVO (for "Constant Velocity Output"), often contains a massive flywheel which is spun and preferably maintained at a constant rate. The great angular momentum of these flywheels makes altering their speed a prohibitively slow process. When coupled to a continuously variable transmission the flywheel can be driven at a constant rate, while the transmission's nominal ratio can be changed to vary the vehicle's speed as desired.

Current terminology in the art regards an infinitely variable transmission as one whose output ratio can be varied from 1:0 to some final ratio x:1, where x is some value greater than zero. Thus, at its lowest ratio, the power source of an infinitely variable transmission can rotate without driving the output shaft. Continuously variable transmissions, in contrast, can only be operated between two limiting ratios, an initial ratio y:1, where y is a value greater than zero and a final ratio z:1, where z is some value less than y.

Both infinitely and continuously variable transmissions can be adjusted so that the nominal ratio varies smoothly and without discrete, quantifiable changes between the initial and final ratios. Since the present invention can be utilized to construct a transmission having an initial ratio of 1:0, it is a true infinitely variable transmission.

There are currently two principal types of infinitely/continuously variable transmissions. The first type depends solely on friction to transmit its power. This type of transmission can be further classified into two sub-categories. One sub-category, commonly termed "pulley transmissions", uses a flexible belt to transfer power between two pulleys whose effective diameters can be varied. As the pulleys' diameters are altered the effective transmission ratio varies. In the other sub-category, power is transferred through contact with a body of continuously varying shape. The typical shape is that of a cone or hyperboloid rotating about its center line. The nominal ratio will depend on where the continuously varying shape is contacted by the pickup shaft, since its effective diameter changes along its length.

The second principal type of variable transmission transfers power using direct engaging mechanical contact, typically through gears. Such transmissions can be distinguished from the aforementioned "friction drives" because mechanical engagement transmissions do not transfer power solely by way of the shearing force developed as a result of the contact force exerted between two moving surfaces. (When two surfaces press against one another the resulting force vector can be resolved into two components. The normal component is that perpendicular to the contact plane of the two surfaces. The tangential, or shear component is the force exerted parallel to the contact plane of the surfaces.) In these mechanical drives, part, if not all, of the power is transferred via this shear force component. The present invention is of this second type of transmission.

All existing designs for continuously and infinitely variable transmissions have a number of shortcomings. Each of the types previously mentioned has its own peculiar problems, caused, inter alia, by the manner in which the tranmission's ratio is altered.

Both types of friction drives, i.e. pulley and variable diameter driving bodies, rely on friction to transfer power. The easiest way to decrease slippage, and thus power loss, is by increasing the contact forces between the parts transferring power. As this contact force increases, however, various problems may arise. Among these problems are structural fatigue and deformation. The touching parts may even begin to wear, necessitating replacement of the belt, pulley or rotating body.

Variable transmissions using mechanisms other than pure friction, such as gears, to transfer power typically contain a substantial number of parts. See, for example, U.S. Pat. No. 4,184,388 (Sfredda). The Sfredda transmission, like the present one, is a mechanical transmission of the second type. Sfredda discloses an infinitely variable transmission utilizing a planetary gear system requiring a large number of parts to effect variability. The instant invention is readily distinguished from this and other transmission art because of its drastic simplification and reduction of parts. In fact, prior art teaches away from such simple mechanisms used in the present invention. This simplification is a primary advantage of the present invention.

OBJECTS AND STATEMENT OF THE INVENTION

It is therefore an object of the present invention to provide a simple apparatus for use in situations where it is desirable to interpose a mechanical transmission between a rotating power source and rotating output assembly.

It is another object of the present invention to provide an apparatus, functioning as an infinitely variable transmission, which is substantially simpler than presently existing variable transmissions.

It is another object of the present invention to provide an apparatus, functioning as an infinitely variable transmission, which obviates the need for the separate clutching mechanism normally required to allow the power input shaft to rotate without corresponding rotation of the output shaft.

Still another object of the present invention is to provide an apparatus, functioning as an infinitely variable transmission, whereby the power input shaft to the transmission can be maintained at a fixed angular velocity while continuously varying the output shafts angular velocity over a range of speeds through variation of the transmission s nominal ratio.

It is another object of the present invention to provide an apparatus, functioning as an infinitely variable transmission, which can be coupled to a rotating power source capable of operation at both fixed and varying angular velocities, and which, when so coupled, forms a system in which the settings of each component, power source and transmission, can be independently selected so as to allow the system to be operated for maximum power output, maximum efficiency, or any performance compromise between these two extremes.

In one advantageous embodiment of an apparatus employing the present invention, the assembly for connecting the input shaft with the output shaft is as follows. The input and output shafts are aligned within a frame or housing in parallel such that their centerlines are not coincident. A drive means and input section, in the form of a plate containing a number of radial slots equiangularly spaced about its center and of uniform length, is rigidly mounted within the housing such that its center and the input shaft's center are coincident. A single head is slidably engaged within each slot and is connected, via a locking means (discussed in greater detail below), to an output section. This output section is composed of the output shaft concentrically fixed to a circular bevel gear. The output shaft has a number of freely rotatable pinion arms, mounted about an extension of the output shaft projecting through the bevel gear. The number of pinion arms can be varied but will coincide with the number of slots in the plate of the aforementioned input section.

The distal end of each pinion arm contains a rotatably mounted pinion gear. The pinion gear engages the bevel gear and is freely rotatable thereabout. The input and output sections are linked by the aforementioned sliding head-plate assembly, wherein each head is fixed to a pinion arm.

Driving of the said bevel gear is accomplished by providing a mechanism wherein the pinion gear of one or more pinion arms can be selectively locked and unlocked in a given sequence. When the pinion gear is locked, the pinion arm is no longer free to pivot about the bevel gear. Instead, the pinion arm, pinion gear and bevel gear cooperate as a single fixed unit. Force, applied to the sliding head through the input section, will be transferred through the pinion arm to the pinion gear, and, in turn, will be transferred through the pinion gear to the bevel gear rigidly fixed to said output shaft.

In actual operation the invention performs as follows. The input shaft and drive means rotate as one body. The sliding heads engaged within the slots in the drive means can only slide radially, and so reciprocate in their respective slots as the drive means rotates. When the pinion assembly attached to a sliding head is locked, it will stay engaged at a fixed circumferential location on the bevel gear. Force is thus transmitted to the output shaft only through locked pinion assemblies. By selectively varying both the angle describing the sector of the bevel gear for which the pinion gear locks, and the excentricity of the parallel input and output shafts, it is possible to obtain wide variations in the nominal ratio of the transmission assembly.

At least two futher advantages obtain to users who connect multiple units of the present invention to one another such that the output of the first unit drives the input of the second unit and so on, until reaching the assemblage's final output. The first advantage to this arrangement involves the multiplication of transmission ratios. By joining a number of similar individual units in the above mentioned fashion, the highest aggregate nominal ratio obtainable will be $X^n$, where n is the total number of units attached to one another and X is the final 'highest' individual nominal ratio of each unit.

The other advantage to connecting multiple units in series is that it is possible to connect the individual transmission units in such a way that the primary input and output shafts can be kept parallel and their centerlines coincident at all times, while preserving both the ability to continuously vary the transmission ratio and the aforementioned exponential multiplication ratio. This is accomplished by rigidly attaching the output shaft of the first transmission unit to the input shaft of the second transmission unit and orienting the units in such a way as to enable them to cooperate as a single assembly. If only two transmission units are connected the output of the second becomes the primary output shaft. If additional units are connected, the output of the second unit is rigidly attached to the input of the third. The output of the third unit either becomes the primary output (if three units are used) or if additional units are used is attached to the input of another unit as described above. This linking process continues for as many units as are desired to effect a given final drive configuration. In operation, the transmission ratio of the total assembly is varied by displacing one or more of the subassemblies perpendicular to the input and output shafts.

The foregoing objects, features and advantages of the present invention will become apparent from the following description of preferred embodiments in connection with the accompanying drawings.

BRIEF DESCRIPTION OF THE DRAWINGS

FIG. 3A a reduced side elevational view of the drive means of FIG. 3;

DETAILED DESCRIPTION OF PREFERRED EMBODIMENTS

Figure 1:
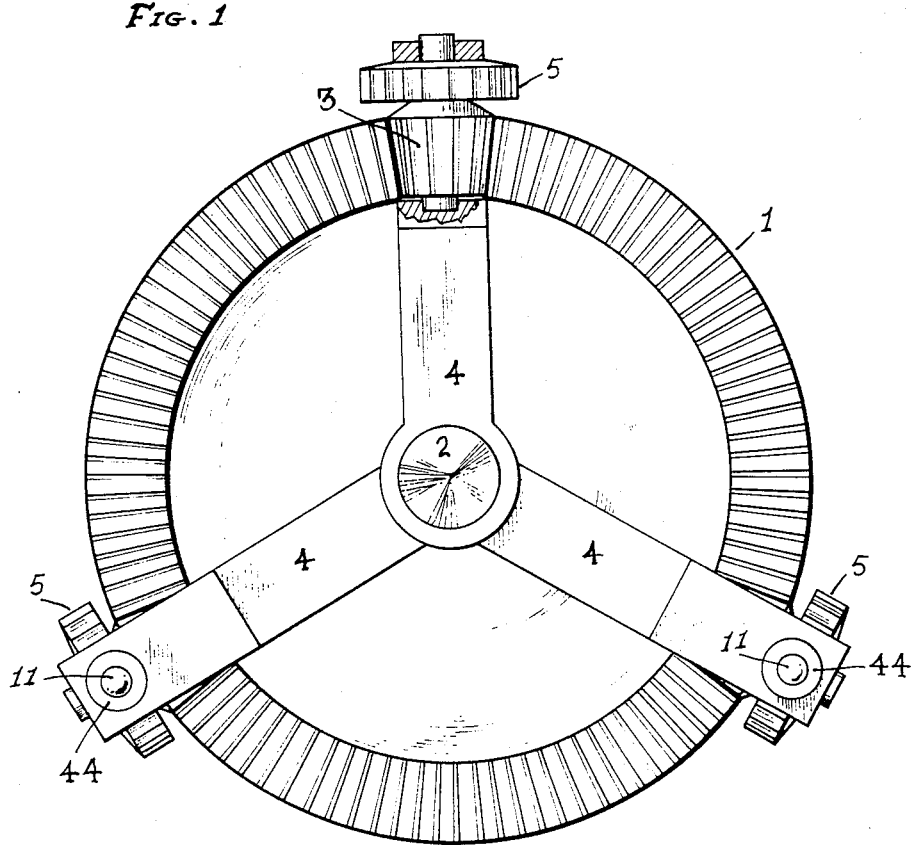
FIG. 1 is a side elevational view of the output section of one embodiment of the present invention.
Figure 2:
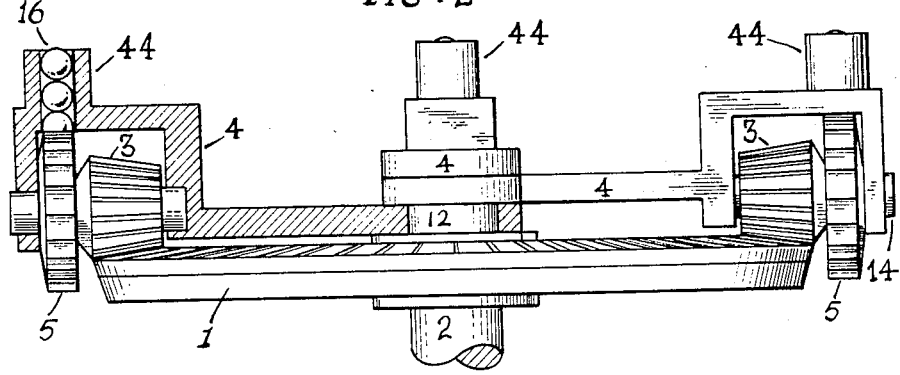
FIG. 2 is a top elevational view, in partial cross-section, of the output section of one embodiment of the present invention.

Referring now to the drawings and, in particular, to FIGS. 1-6, there is depicted one embodiment for an apparatus in accordance with the present invention.

FIG. 1 is a side view of the output means showing the output shaft 2 connected to straight bevel gear 1. This shaft 2 is fixed into a frame or housing (not shown). Three pinions 3 continuously mesh with bevel gear 1 and are held in engagement by radial pinion arms 4. Each radial pinion arm 4 is independently rotatable about a common shaft 12 located at the center of bevel gear 1 in concentric alignment with output shaft 2. Pinions 3 are mounted on longitudinal shaft 14 and rotate freely thereon. In this embodiment, a sprocket 5 is fixed to the distal end of pinion 3 for coupled rotation about longitudinal shaft 14. The distal end of pinion arm 4 is provided with a head 44 which contains sprocket engagement means 16.

In accordance with this invention, means are provided for preventing rotation of the sprocket 5. As embodied, this means includes a plurality of balls 11 held in position in head 44 which balls engage sprocket 5 when the outermost ball is depressed. The sprocket engagement means shown represents only one method for preventing the rotation of sprocket 5 and pinion 3. Alternative methods including pins, shafts, levers, brake bands, etc., are contemplated and would not affect the overall operation of the present invention.

Sprocket 5 is spring loaded 26 in a manner that allows it to undergo limited free rotation independent of the related pinion's movement. This lost rotational motion allows for the alignment of an indentation of sprocket 5 and the locking ball 11, when the ball engages the sprocket to prevent its rotational motion.

Figure 3:
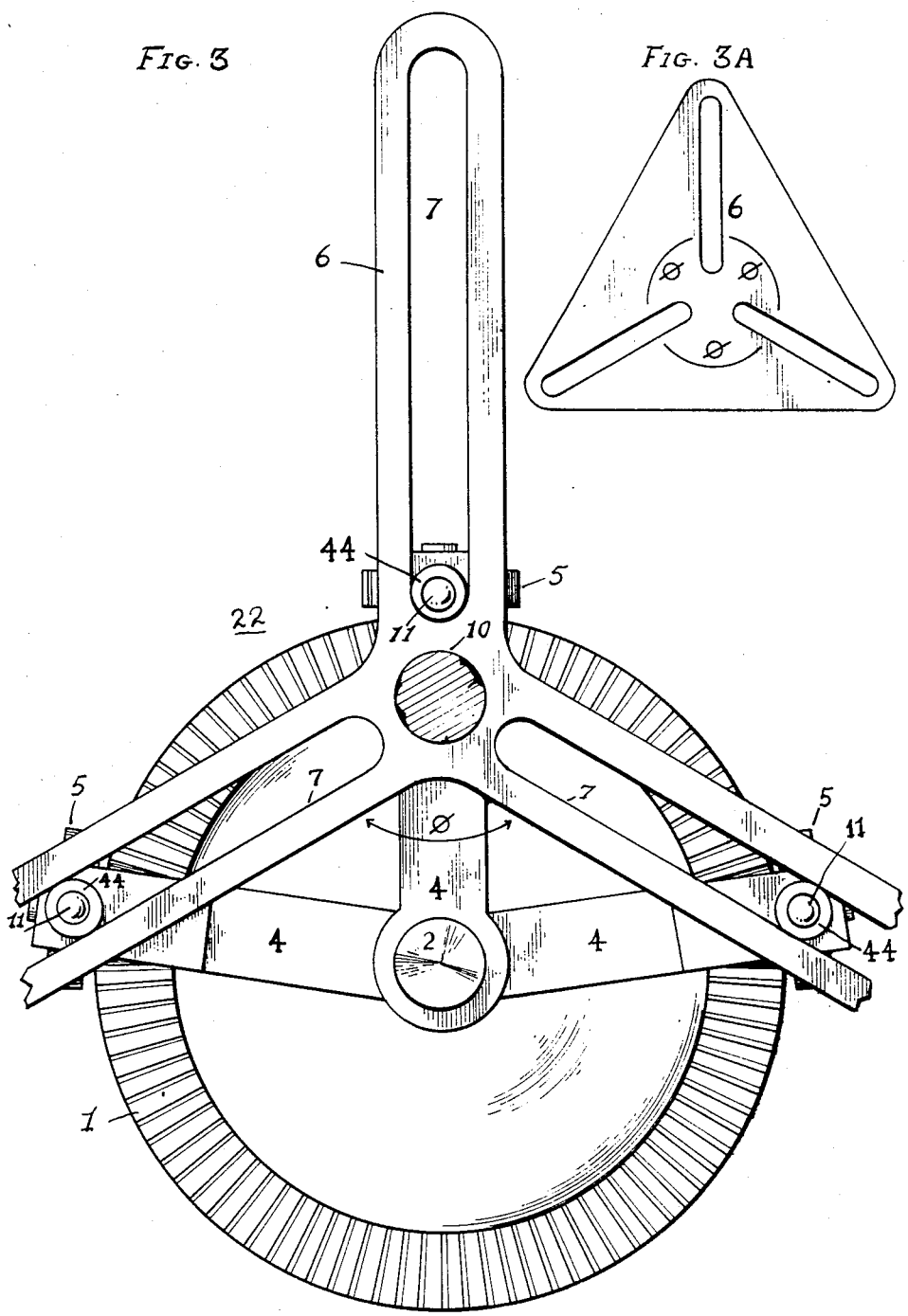
FIG. 3 is a side elevational view, in partial cross-section, from the input section of one embodiment of a single unit of the present invention taken.

Bevel gear 1 is rotatably driven by input means shown generally at 22 of FIG. 3. Input means 22 includes an equilateral triangular plate 6 having radial slots 7 formed therein at angles of 120°. This angle $\theta$, corresponds to the number of pinions utilized in the output means. [$\theta$ is equal to 360° divided by n, where n is the number of slots in the plate.] For example, if nine (9) pinions are to be used in engagement wit bevel gear 1, then an equilateral polygonal plate would be utilized having nine (9) radial slots formed therein at angles of 40°. With the teachings of the present invention, any number of pinions can be used to drive bevel gear 1 simply by designing a corresponding slotted plate.

Radial slots 7 in plate 6 each receive a pinion arm head 44 which is driven radially within the slot 7 as plate 6 rotates. Input shaft 10 is adjustably mounted in the housing (not shown) and is fixed in the center of plate 6 where it serves to drive plate 6 in a rotational motion about its axis.

Figure 6:
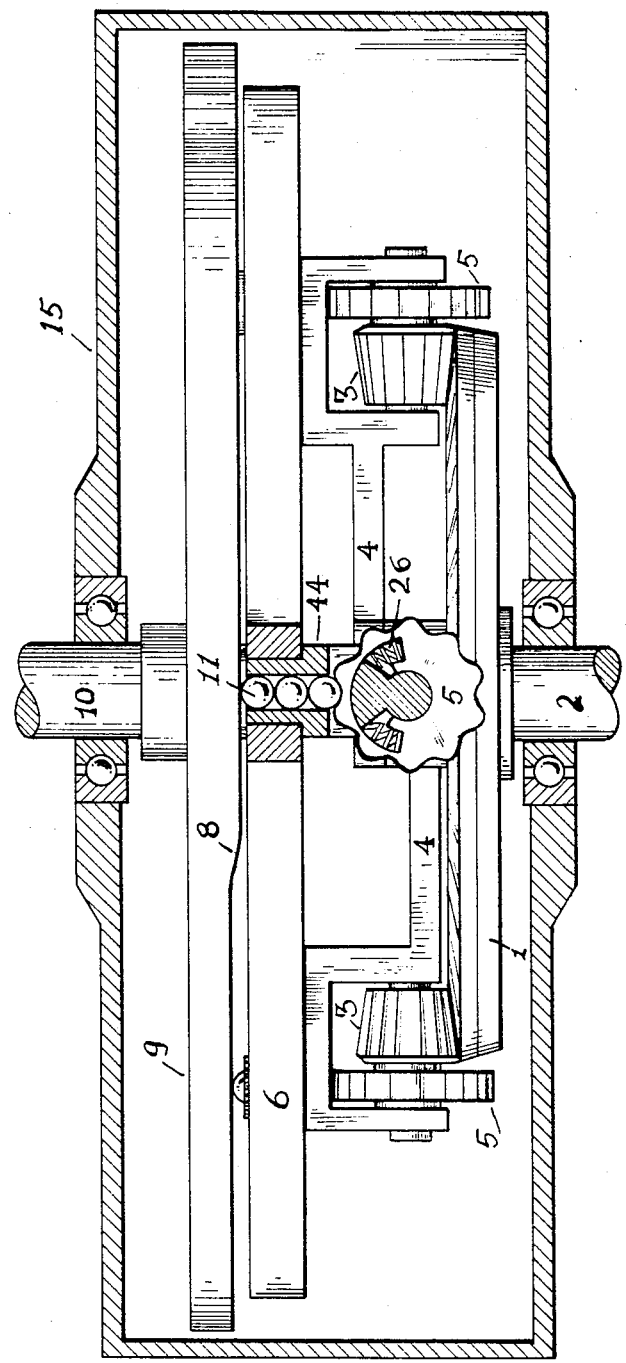
FIG. 6 is a top elevational view, in partial cross-section of one embodiment of the present invention.

In accordance with this invention means are provided for forcing the sprocket engaging means into engagement with the sprocket as embodied. Referring to FIG. 6 this means includes cam 8, which is rotatably mounted on input shaft 10 in a plane parallel to plate 6. The inner surface of cam 8 is alternately brought into contact with sprocket engagement means 16 and serves to move balls 11 into head 44 causing engagement of sprocket 5. In this engaged position, pinion 3 is blocked from rotating about bevel gear 1 and thus creates a rigid linkage through which bevel gear 1 is driven.

In this embodiment, cam 8 is in the form of a sector of angle $\theta$ about the center of input shaft 10, wherein $\theta = 120°$. This permits only one pinion 3 to drive bevel gear 1 at any given time, since the pinion arms 4 move, through radial slots 7 which slots are separated by angle, $\theta$, wherein $\theta = 120°$. By forming cam 8 with an angle $\theta$ equal to the angle $\theta$ between the radial arms a drive system comprising a slot, a head, an engaged sprocket/pinion and bevel linkage is formed wherein only one sprocket is engaged at any given time, and thus only one pinion at a time will be driving. Where desired, these angles $\theta$ or $\theta$ can be varied to produce drive systems where more than one sprocket is engaged simultaneously or to produce a drive system wherein a spatial gap exists between the formation of rigid driving linkages, resulting in intermediate driving of bevel gear 1.

Figure 4:
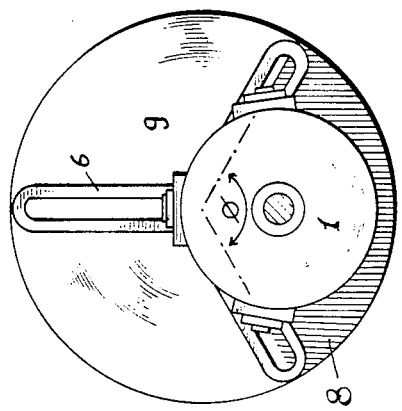
FIG. 4 is a reduced side elevational view, taken from the output section, wherein the cam plate is shown in its uppermost rotational position.
Figure 4A:
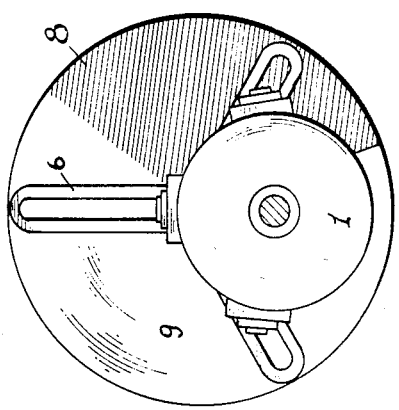
FIG. 4A is a side elevational view showing incremental rotation of the biasing cam.
Figure 5:
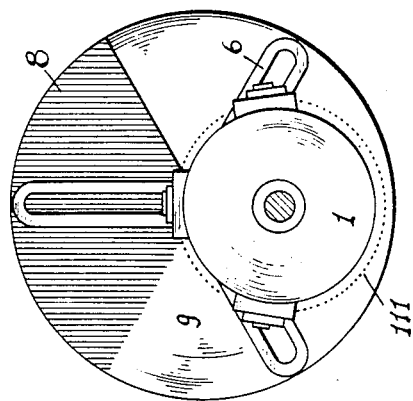
FIG. 5 is a reduced side elevational view, taken from the output section, wherein the cam plate is shown in its lowermost rotational position.

Variations in the nominal gear ratio of the embodiment shown in FIGS. 4-6 can be accomplished in a variety of ways. For example, as shown in FIGS. 4-5, by incrementally rotating cam 8 through some arc of less than 360° about input shaft 10 and fixing it in the desired attitude, the Path followed by head 44 across cam 8 is lengthened or shortened, resulting in an increase or decrease, respectively, in the nominal gear ratio. In FIG. 4 the circle 111 represents the output circumference. In this manner, relatively minute variations in the gear ratio can be effected.

In addition to incrementally rotating cam 8 as described above, the length of the input torque arm, defined as the radial distance between the center of a locked head 44 to the center of input shaft 10, can be varied by raising and/or lowering the input shaft 10 relative to output shaft 2. This vertical movement can provide even larger changes in the nominal gear ratio by creating a greater possible range of lengths for the input torque arms driving the head 44 across the zone defined by the edges of cam 8. Utilizing the methods outlined above, either together or separately, the nominal gear ratio can be varied smoothly over a wide range to achieve a desired ratio. This variation can be effected continuously to change the ratio in response to the needs or requirements of the operator or the equipment.

Figure 7:
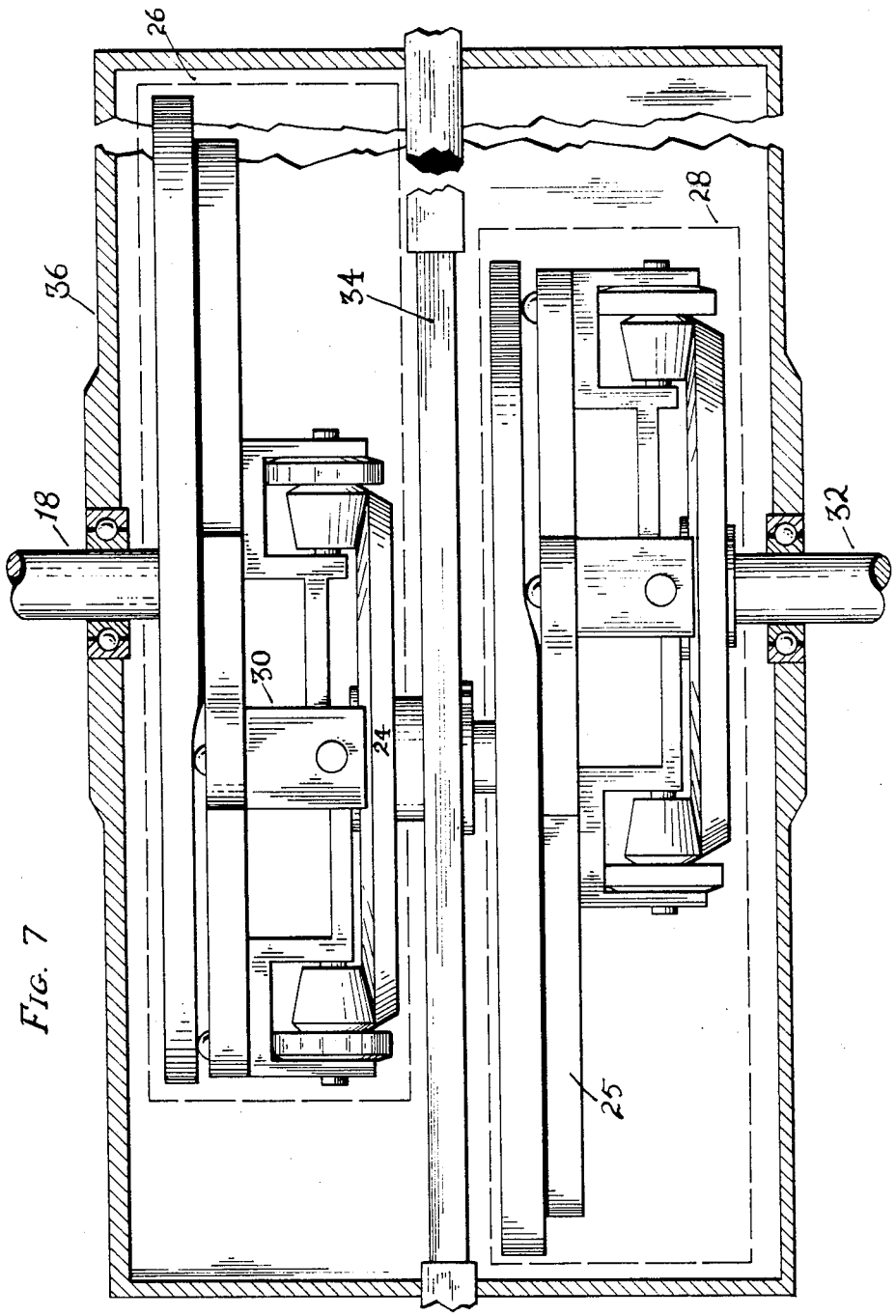
FIG. 7 is a top elevational view of an alternate embodiment of the present invention.

Referring now to FIG. 7, there is depicted an alternate embodiment of the present invention. A primary input shaft 18 (corresponding to the input shaft 10 depicted in FIG. 3) is connected to an assemblage 26 which is described by and corresponds to the embodiment fully disclosed in FIGS. 1-6. Assemblage 26 is rigidly coupled, via common shaft 30, to a second assemblage 28 which is also described by and corresponds to the embodiment fully disclosed in FIGS. 1-6. Common shaft 30 transmits power from shaft 18 between assemblage 26 and assemblage 28. Shaft 30 also constrains the assemblages 26 and 28 to rotate as a single unit. The primary output shaft 32 (corresponding to the shaft 2 depicted in FIG. 6) can then be connected as desired to equipment to be driven. The common shaft 30 is rotatably mounted in the push-pull rod 34 such that while the shaft is free to rotate it is constrained to follow the lateral movements of push-pull rod 34. Push-pull rod 34 is slidably mounted in the transmission frame 36 such that it can be moved along a line perpendicular to the center line of shafts 18, 30, 32.

Assemblages 26 and 28 are mounted in such an orientation that when viewed along centerline of shafts 18 and 32, assemblage 28 can be seen to have been rotated exactly 180° from the orientation of assemblage 26. The purpose for maintaining the two assemblages 26, 28 in this particular orientation will become apparent when the operation of this embodiment is discussed below.

In operation the nominal ratio of this embodiment is controlled by laterally shifting the push-pull rod 34. As push-pull rod 34 is displaced, the common shaft 30 and other parts attached to the bevel gear 24 and equilateral triangular plate 25 are also displaced. If, in FIG. 7, the push-pull rod 34 is shifted further to the right the nominal ratio of assemblage 26 will change from X:1 to X':1 where X' is some value less than X. At the same time, because assemblages 26 and 28 are mounted such that one is held at 180° relative to the other, shifting push-pull rod 34 further to the right also changes the nominal ratio of assemblage 28 from Y:1 to Y':1 where Y' is some value less than Y. X need not be equal to Y, but it is possible to construct an embodiment such that they are equal. Embodiments can be constructed where the nominal ratio R of the transmission is equal to $X^2$ wherein X is the nominal ratio of each assemblage 26, 28. Likewise, moving the push-pull rod to the left will cause the nominal transmission ratio to decrease.

Figure 8:
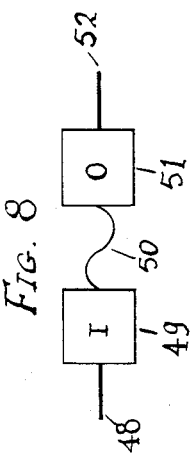
FIG. 8 is a schematic block diagram of the functional components of the present invention.

FIG. 8 is a schematic block diagram describing the embodiment disclosed in FIGS. 1-6 and showing its functional component subassemblies. The input shaft 48 is connected to the input section 49. The input section 49 contains parts corresponding to the input shaft 10 and equilateral triangular, plate 6 shown in FIG. 3. The input section 49 is connected to the output section 51 via the connecting means 50. The connecting means 50 contains parts corresponding to the head 44, pinion arm 4, balls 11, sprocket 5, pinion 3 and cam 8 shown in FIG. 6. The output section 51 contains parts corresponding to the bevel gear 1 and output shaft 2 shown in FIG. 6.

Figure 9:
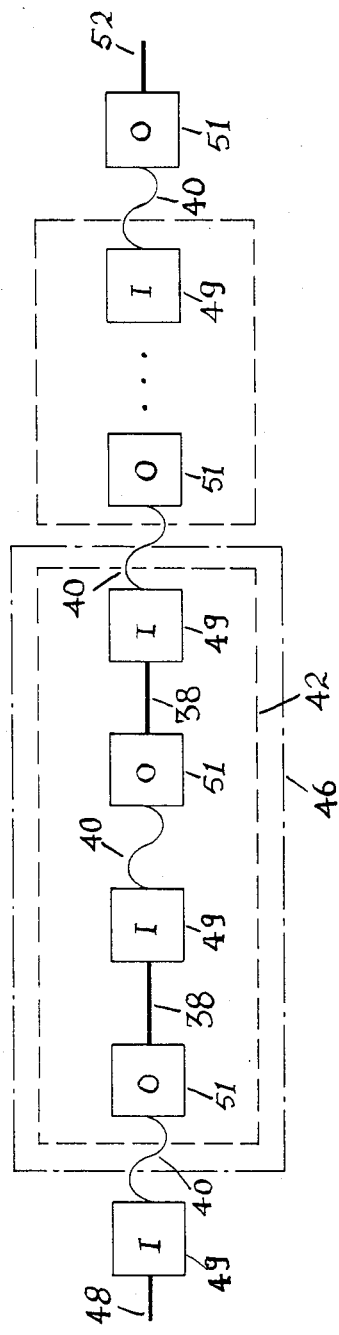
FIG. 9 is a schematic block diagram illustrating multiple units of the present invention attached in series.

FIG. 9 is a schematic diagram showing how the functional component subassemblies illustrated in FIG. 8 can be combined to produce alternate embodiments employing more than one unit described in this invention. In FIG. 9 the input and output sections, 49 and 51 respectively, are connected, as shown in FIG. 8, by connecting means 40. The output sections 51 drive input sections 49 via common shafts 38. Because the common shafts 38 force the output sections 51 to move with the input sections 49 which they drive, both in terms of angular and lateral movements, these output-input pairs 42 can be viewed as a single subassembly. If a single output-input pair 42 is used it must then be connected via connecting means 40 to a final output unit 51, which then drives the output shaft 52. If more than one output-input pair 42 is used, they are connected to additional output-input units 42. The final output-input unit 42 drives the output shaft 52 via a final output unit 51.

In connecting the individual units which are disclosed in FIGS. 1-6 of this invention it is important to align the units so that lateral displacements of a single output-input pair 42 will not cause the nominal ratio of one of the two units it contains to increase and the other decrease. By orienting one unit 180° relative to the other it is possible to simultaneously increase or decrease both units+ratios by shifting the output-input pair.

It is also possible to move more than a single output-input pair 42 to effectuate a ratio variation. It is additionally possible to adjust a number of output-input pairs 42 separately or as a group.

As has already been noted in the discussion concerning the preferred embodiment shown in FIG. 7, it is possible to construct the embodiment discussed in FIGS. 8-9 in such a way as to continuously preserve the concentricity of the input 48 and output 52 shafts, while also preserving the exponential multiplication ratio inherent in such multi-unit assemblies.

Although particular illustrative embodiments of the present invention have been described herein, the present invention is not limited to these embodiments. Various changes, substitutions and modifications may be made thereto by those skilled in the art without departing from the spirit or scope of the invention defined by the appended claims.

We claim:

1. An infinitely variable speed transmission comprising:
    a transmission housing;
    an input drive shaft rotatably mounted in said transmission housing;
    drive plate means having a plurality of radial drive surfaces therein, said drive plate means fixed to said input drive shaft;
    an output drive shaft rotatably mounted in said transmission housing eccentric to said input shaft;
    a bevel gear fixed to said output drive shaft;
    a plurality of independently rotatable pinion arms, each arm having a proximal and distal end and being rotatably fixed to said output drive shaft at its proximal end;
    a plurality of pinion gears rotatably mounted in said distal ends of said rotatable pinion arms, said pinions engaging said bevel gear; head means, fixed to said pinion arms and engaging said radial drive surfaces in said drive plate means; and
    pinion engagement means for locking said pinion gears in sequence to effect driving of said bevel gear.

2. An infinitely variable speed transmission as in claim 1, wherein said pinion engagement means comprises:
    locking means disposed in said head means; and a cam fixed to and independently rotatably fixable about said input drive shaft, said cam activating said locking means in sequence to drive said bevel gear.

3. An infinitely variable speed transmission as in claim 2, wherein said locking means comprises:
    at least one spring-loaded member disposed in each of said head means perpendicular to said pinion for engaging and locking said pinion when said spring-loaded member is biased by said cam.

4. An infinitely variable speed transmission as in claim 3, further comprising:
    a sprocket fixed to said pinion and rotatable therewith, said sprocket positioned in alignment with said spring-loaded locking member to lock said pinion.

5. An infinitely variable speed transmission as in claim 1, wherein said input drive shaft is vertically movable relative to said output drive shaft.

6. An infinitely variable speed transmission as in claim 1, wherein said output drive shaft is vertically movable relative to said input shaft.

7. An infinitely variable speed transmission as in claim 1 wherein said radial drive surfaces comprise a plurality of radial grooves therein for engaging said head means.

8. An infinitely variable speed transmission as in claim 7 wherein said grooves extend through said drive plate means to form slots therein.

9. An infinitely variable speed transmission as in claim 1 wherein said drive plate means is in the form of a polygonal drive plate.

10. An infinitely variable speed transmission as in claim 1 wherein a plurality of said transmissions are connected in series such that the output shaft is connected to the input shaft of subsequent transmissions.

11. An infinitely variable speed transmission as in claim 10 wherein a plurality of said transmissions are connected together such that said output shaft is connected to the input shaft of subsequent transmissions.

12. An infinitely variable speed transmission comprising: a transmission housing;

- an input drive shaft rotatably mounted in said transmission housing;
- first drive plate means having a plurality of radial drive surfaces therein, said first drive plate means fixed to said input drive shaft;
- a common shaft eccentric to said input drive shaft;
- slide means attached to said common shaft, adjustably mounted in said transmission housing, for varying the eccentricity of said input shaft and said common shaft;
- a first bevel gear fixed to said common shaft;
- a first plurality of independently rotatable pinion arms, each arm having a proximal and distal end and being rotatable about said common shaft at its proximal end;
- a plurality of first pinion gears rotatably mounted in the distal ends of said first rotatable pinion arms, said pinions engaging said first bevel gear; first head means, fixed to said first pinion arms and engaging said radial drive surfaces in said first drive plate means;
- first pinion engagement means for locking said first pinion gears in sequence to effect driving of said first bevel gear;
- second drive plate means having a plurality of drive surfaces therein, said second drive plate means fixed to said common shaft;
- an output drive shaft rotatably mounted in said transmission housing;
- a second bevel gear fixed to said output drive shaft;
- a second plurality of independently rotatable pinion arms, each arm having a proximal and distal end and being rotatable about said output drive shaft;
- a plurality of second pinion gears rotatably mounted in the distal ends of said first rotatable pinion arms, said pinions engaging said second bevel gear;
- second head means, fixed to said second pinion arms and engaging said radial drive surfaces in said second drive plate means; and
- second pinion engagement means for locking said second pinion gears in sequence to effect driving of said second bevel gear.

* * * * *